T. C. MERZ.
VEHICLE CURTAIN.
APPLICATION FILED JULY 15, 1912.
1,044,900.
Patented Nov. 19, 1912.
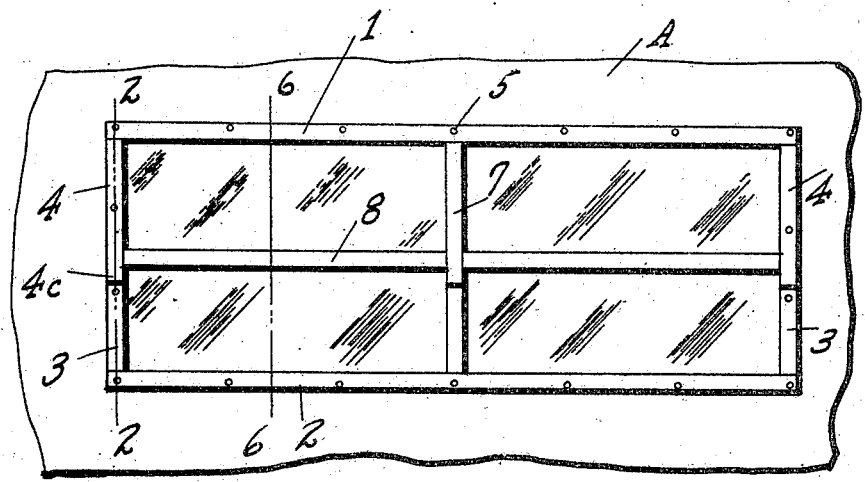
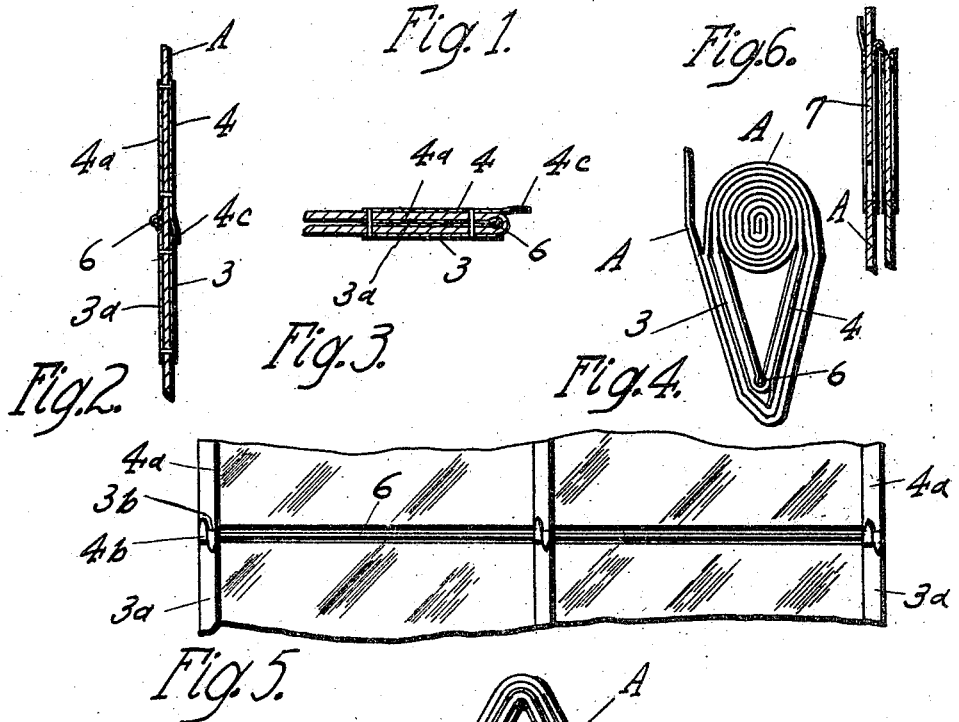
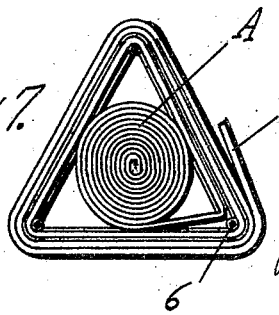
WITNESSES:
Paul A. R. Kroesing, jr.
Virginia C. Spratt.
INVENTOR
Theodore C. Merz
BY
Ralgemond A. Parker
ATTORNEY

UNITED STATES PATENT OFFICE.

THEODORE C. MERZ, OF DETROIT, MICHIGAN, ASSIGNOR OF ONE-HALF TO SOLOMON E. HEINEMAN, OF DETROIT, MICHIGAN.

VEHICLE-CURTAIN.

1,044,900.  Specification of Letters Patent.  Patented Nov. 19, 1912.

Application filed July 15, 1912. Serial No. 709,322.

*To all whom it may concern:*

Be it known that I, THEODORE C. MERZ, a citizen of the United States, residing at Detroit, county of Wayne, State of Michigan, have invented a certain new and useful Improvement in Vehicle-Curtains, and declare the following to be a full, clear, and exact description of the same, such as will enable others skilled in the art to which it pertains to make and use the same, reference being had to the accompanying drawings, which form a part of this specification.

This invention relates to vehicle curtains and has for its object a curtain that is provided with a large folding window of two or more sashes which may carry window panes of glass and at the same time fold up with the curtain and be stowed away when not desired for use.

In the drawings:—Figure 1, is a front elevation of a portion of the curtain and the window frame. Fig. 2, is a section on the line 2—2 of Fig. 1. Fig. 3, is a section on the same line, but showing the frame members folded together. Fig. 4, is an end view and shows a window of two frames folded up and the curtain rolled about it to be stowed away. Fig. 5, is a rear view of a portion of the window frame, showing the joint. Fig. 6, is a section on line 6—6 of Fig. 1, showing how the panes may slip out of the lower frame. Fig. 7, is an end view of a window of four frames folded up and the curtain rolled about it.

1, is the upper frame bar; 2 the lower frame bar; 3 the side frame bars of the lower frame and 4 the side frame bars of the upper frame. All of these frame bars comprise two pieces of thin metal that are riveted together by the rivets 5 so that they pinch the curtain cloth A and afford a space on their inside into which the window panes may be placed and secured by putty or otherwise. The curtain cloth is made full enough at the sides of the frames so that the extra cloth necessary for the additional total length of the frame bars in opening out is afforded. The strips $3^a$ and $4^a$ at the rear (the rear being considered as the side toward which the sashes fold together) and that form the side frame bars have their ends half cut away, and the remaining half portions bent up over the cross rod, or hinging rod 6. The half portion $4^b$ adjoins to the side strip $4^a$ and the half portion $3^b$ adjoins to the side strip $3^a$. The strips on the opposite side of the window indicated as 3 and 4 in Fig. 1, are arranged so that the upper strip has a portion $4^c$ that overlaps the lower strip 3. The same construction is used for the metal frame bar 7, both rear and front.

The half portions of the frame bars form the knuckles of the hinge and the rod 6 forms the knuckle pin. A horizontal frame bar 8 is attached to the two upper side bars 4 and the upper metal frame bar 7. When the window is in extended position as shown in Fig. 1, this forms a complete water shed and makes the window weather tight. When the window is folded in position shown in the end view of Fig. 6, the tops of the window panes of the lower frame are unconfined and the windows may be readily slid in or out of the frame after the securing putty or other fastening means is removed, if such is used.

Fig. 4, shows how the lower portion of the curtain is rolled up and pushed in between the folding upper and lower frame and then the whole is rolled up with the folded window inside. This form of construction affords a window for the rear curtains of automobiles or other vehicles which may be constructed of glass which is considerably more suitable for this purpose, because of its greater transparency. The construction, as above given, affords such a folding window which is both an effective excluder of the weather and an economical structure.

Fig. 7, shows how the frames fold together and how the curtain is rolled up within and about them when more than two frames are used. These frames have, of course, to be made of different widths so as to take their proper position about each other in the folding up process, but this is a mere matter of calculation and need not be detailed. In this figure the window is shown collapsed into a prismatic figure triangular in cross section, but it is obvious that its collapsing positions may be those of other prismatic figures.

What I claim is:—

1. A curtain, having in combination a cloth portion and a collapsible window comprising a plurality of folding frames that are hinged together, the said hinges and frames being arranged so that when the frames are opened out into a common plane, the upper frame overlaps the next lower frame to provide a water shed and to exclude the weather, substantially as described.

2. A curtain, having in combination, a cloth portion, and a collapsible window comprising a plurality of folding frames, the frames being of varying sizes to fold into a prismatic figure in collapsing and be rolled up with the cloth to which they are secured, substantially as described.

3. A curtain, having in combination a cloth portion, a pair of window frames secured thereto and comprising frame bars, the side bars of which open out so that the upper side bars overlap the lower frame bar and the central horizontal frame bar of the upper frame overlaps the top of the lower frame to provide a water shed, the said frame being foldable with respect to each other so as to roll up with the curtain cloth, substantially as described.

4. A curtain, having in combination, a cloth portion, a pair of folding window frames, comprising frame bars constructed of strips that hold the panes of glass and the cloth portions, the strips on the side that the frames fold being halved and bent into the form of knuckles and a rod passed through the knuckles and forming the knuckle pin of the hinge formed thereby, substantially as described.

In testimony whereof, I sign this specification in the presence of two witnesses.

THEODORE C. MERZ.

Witnesses:
STUART C. BARNES,
VIRGINIA C. SPRATT.